United States Patent
Brooks et al.

(10) Patent No.: US 7,662,278 B2
(45) Date of Patent: Feb. 16, 2010

(54) SELF-CLEANING FILTER ASSEMBLY

(75) Inventors: Steve Martin Brooks, Surrey (GB); Robert Ivan John Wiedemann, Middlesex (GB); David Goodwin, Surrey (GB)

(73) Assignee: Pet Mate Ltd., Hersham, Surrey (GB)

( * ) Notice: Subject to any disclaimer, the term of this patent is extended or adjusted under 35 U.S.C. 154(b) by 0 days.

(21) Appl. No.: 10/410,170

(22) Filed: Apr. 10, 2003

(65) Prior Publication Data
US 2004/0020842 A1 Feb. 5, 2004

Related U.S. Application Data

(63) Continuation-in-part of application No. 10/255,625, filed on Sep. 27, 2002, now abandoned.

(30) Foreign Application Priority Data

Oct. 3, 2001 (GB) ................................ 0123761.9
Oct. 3, 2002 (GB) ................................ 0222941.7

(51) Int. Cl.
*B01D 29/62* (2006.01)

(52) U.S. Cl. ......................... 210/106; 210/108; 210/303; 210/314; 210/335; 210/350; 210/354; 210/356; 210/409; 210/411; 210/422; 210/424; 210/456; 210/488

(58) Field of Classification Search .................. 210/108, 210/224, 225, 299, 303, 314, 333.01, 350–352, 210/411–414, 422–427, 456, 457, 488, 335, 210/354, 356, 409; 29/888.04–888.047
See application file for complete search history.

(56) References Cited

U.S. PATENT DOCUMENTS

| 3,617,551 | A | | 11/1971 | Johnston et al. |
| 4,039,452 | A | | 8/1977 | Fernandez .................. 210/106 |
| 4,213,863 | A | * | 7/1980 | Anderson .................... 210/108 |
| 4,356,090 | A | | 10/1982 | Tran ............................ 210/350 |
| 4,450,610 | A | * | 5/1984 | Schaper ................. 29/888.046 |
| 5,234,605 | A | * | 8/1993 | Reipur et al. ................ 210/741 |

FOREIGN PATENT DOCUMENTS

DE 10101313 A1 7/2001

* cited by examiner

*Primary Examiner*—Joseph W Drodge
(74) *Attorney, Agent, or Firm*—Miles & Stockbridge P.C.

(57) ABSTRACT

A self-cleaning assembly comprising an enclosed casing 1 with a movable piston 31 and filters 32,33 therein. The preferred assembly has a casing 1 with a dirty water inlet 5, a first outlet 6 for clean filtered water and a second outlet 7 for the removal of sludge from the casing. The filter assembly is constructed and arranged to provide, in its normal operating mode, a liquid flow path through the filter 32,33 in a first direction between the dirty water inlet 5 and the clean water outlet 6 and, in a cleaning mode, to provide a liquid flow path in a second direction between the dirty water inlet 5 and the sludge outlet 7. In the cleaning mode, the movable member 31 compresses the filters 32,33 during the liquid flow in the second direction and contaminant is released therefrom for removal from the filter assembly via the second outlet 7. In an alternative embodiment, the sludge outlet 7 is omitted and sludge is removed from the casing via the outlet 6.

51 Claims, 10 Drawing Sheets

100 # SELF-CLEANING FILTER ASSEMBLY

CROSS-REFERENCE TO RELATED APPLICATION

This application is a continuation-in-part of application Ser. No. 10/255,625 filed Sep. 27, 2002, now abandoned, which is incorporated herein by reference.

This invention relates to a self-cleaning filter assembly and more particularly but not exclusively to a filter assembly for use with a pond pump.

A pond filter usually includes an open cell foam or similar compressible filter media designed to remove contaminants and debris from water pumped through the filter. The filter media can soon become blocked with a consequent loss in filtering efficiency. The filter then needs to be disassembled so that the filter media can be removed and cleaned. This is both messy, time consuming and can frequently lead to the destruction of beneficial bacteria in the filter medium.

It is therefore an object of the invention to provide a filter assembly which can be efficiently cleaned without removal of the filter medium therefrom.

According to the invention, there is provided a self-cleaning filter assembly comprising an enclosed casing with a movable member/piston and a filter therein, the casing having an inlet for dirty liquid containing contaminant supplied thereto and an outlet, the filter assembly being constructed and arranged to provide, in its normal operating mode, a liquid flow path through the filter in a first direction between the inlet and the outlet and, in a cleaning mode, to provide a liquid flow path through the filter in a second direction from the inlet to the outlet, the movable member compressing the filter during the liquid flow in said second direction so that contaminant is released therefrom for removal from the filter assembly.

Contaminant released from the filter can either be removed from the casing via the outlet or it can be removed via an additional outlet.

Preferably the liquid flow through the casing from the inlet to the or each outlet is controlled by valve means which can comprise one or more separate valve assemblies.

In the preferred embodiment, a main tube is provided in the casing to feed liquid from the inlet to the bottom thereof, the main tube having an outlet located adjacent the bottom of the casing. Conveniently a deflector is positioned directly opposite the main tube outlet, the deflector being shaped to deflect the liquid flow from the main tube outlet radially outwardly and upwardly into the casing. Conveniently the deflector is a saucer-shaped member.

Preferably the main feed tube is located centrally in the casing and the casing has a perforated floor spaced from the bottom of the casing to provide a settlement chamber for contaminant flushed from the filter, the main tube outlet opening into said chamber.

Preferably the filter rests on the perforated floor but is axially movable in the housing along the main tube. The filter can comprise a single element but preferably comprises a plurality of separate filter elements stacked one on top of each other. In the preferred embodiment, the filter comprises two filter elements made, for instance, of an open cell polyethylene foam material.

The movable member/piston is preferably made of a closed cell flexible foam such as neoprene. It can however be made of a rigid material with a flexible edge seal made, for instance, of rubber. Alternatively, the piston can include a one way valve or valves therein which allows normal upward liquid flow therethrough but not downward reverse flow. The movable member/piston needs to make an edge seal with the housing during reverse flow so that the liquid pressure build-up moves the piston axially in the housing to compress the filter and squeeze contaminant therefrom.

Preferably a secondary tube extends through the casing and includes means to connect the settlement chamber with the additional outlet.

Conveniently, a movable perforated container is mounted around the main and secondary tubes and is slidable therealong, said chamber normally resting on the top filter element.

In the preferred embodiment, an abutment is provided in the casing adjacent the upper end thereof to limit axial movement of the perforated container towards the top of the casing.

Preferably the valve means comprises a valve assembly mounted in a chamber in the casing, the arrangement being such that liquid supplied to or leaving the casing is fed through the chamber containing the valve assembly, the chamber having a wall with ports therein and a floor with a port therein communicating with the interior of the casing.

In the preferred embodiment, in which the casing has an additional outlet for contaminant removed from the filter, when the valve assembly is in a first position, liquid is fed from the inlet to the interior of the casing via ports in the wall of the valve chamber, the port in the floor of the valve chamber allowing liquid to leave the casing and flow to only the first liquid outlet. The valve assembly is however movable to a second position in which liquid from the inlet is fed to the interior of the casing through the port in the floor of the valve chamber, liquid containing contaminant being fed from the interior of the casing to only the additional liquid outlet via ports in the valve chamber wall. The valve assembly is also movable to a third position in which liquid is fed from the liquid inlet to the interior of the casing via ports in the wall of the valve chamber, liquid containing contaminant being fed from the interior of the casing to only the additional liquid outlet via the port in the floor of the valve chamber and a port in the wall thereof.

In the preferred embodiment, the valve assembly is rotatably mounted in the valve chamber, the valve having portions movable to obturate the ports in the chamber wall to vary the direction of liquid flow when the valve is in said first, second and third positions. Preferably the valve also has a portion which splits the liquid flow through the port in the floor of the valve chamber.

A preferred embodiment of the invention will now be described, by way of example only, with reference to the accompanying drawings, in which.

Figure 1:
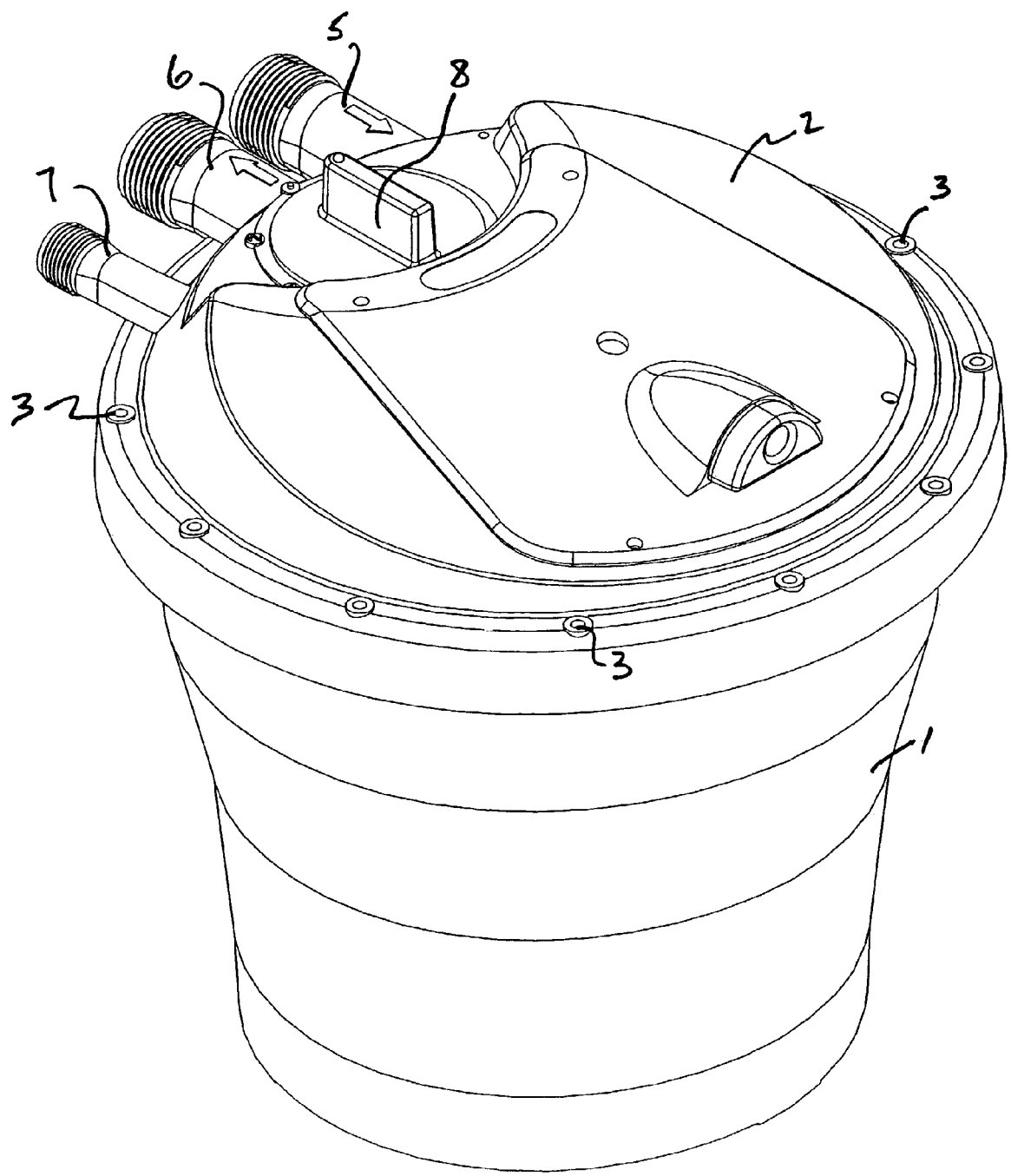
FIG. 1 is a perspective view of a filter assembly of the present invention.

Referring to the drawings and particularly FIG. 1 thereof, there is illustrated a preferred filter assembly of the present invention which comprises a casing 1 having a lid 2 securely attached thereto by means of bolts 3. The casing 1 has a dirty liquid inlet 5, a filtered outlet 6 and also an additional sludge outlet 7 for liquid containing contaminant removed from the filter. A valve to be described in more detail hereafter is mounted in the lid 2 and has a knob 8 which is rotatable into one of several positions as will be described hereafter.

Figure 2:
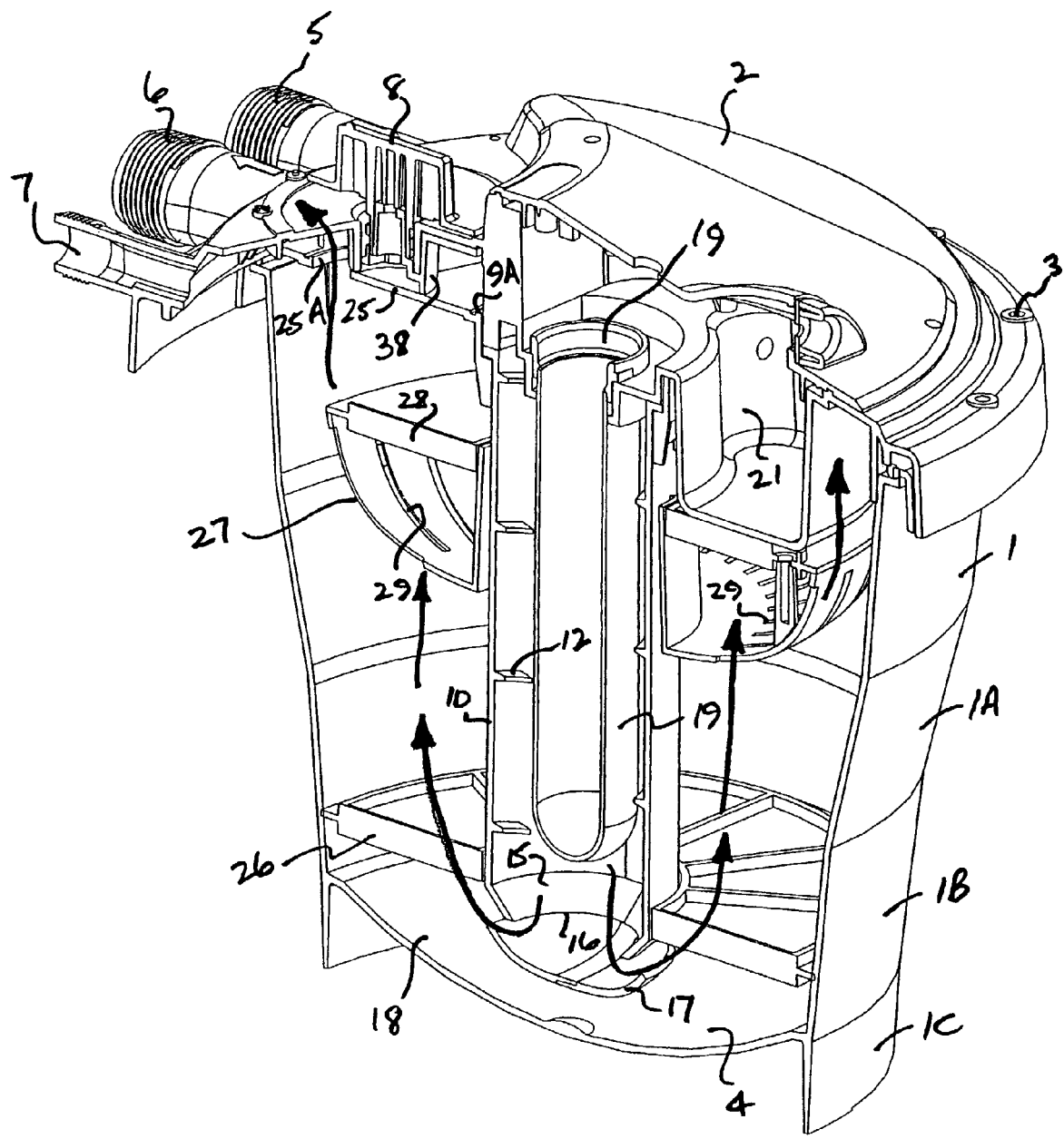
FIG. 2 is a perspective view in cross section of the filter assembly shown in FIG. 1.

Referring now to FIG. 2, it can be seen that the casing 1 is generally tapered in cross section and includes tapered sections 1A and 1B. An annular lip 1C surrounds the base of the casing 1. The casing 1 has an arcuate bottom 4. The casing need not necessarily be tapered as illustrated.

Figure 3:
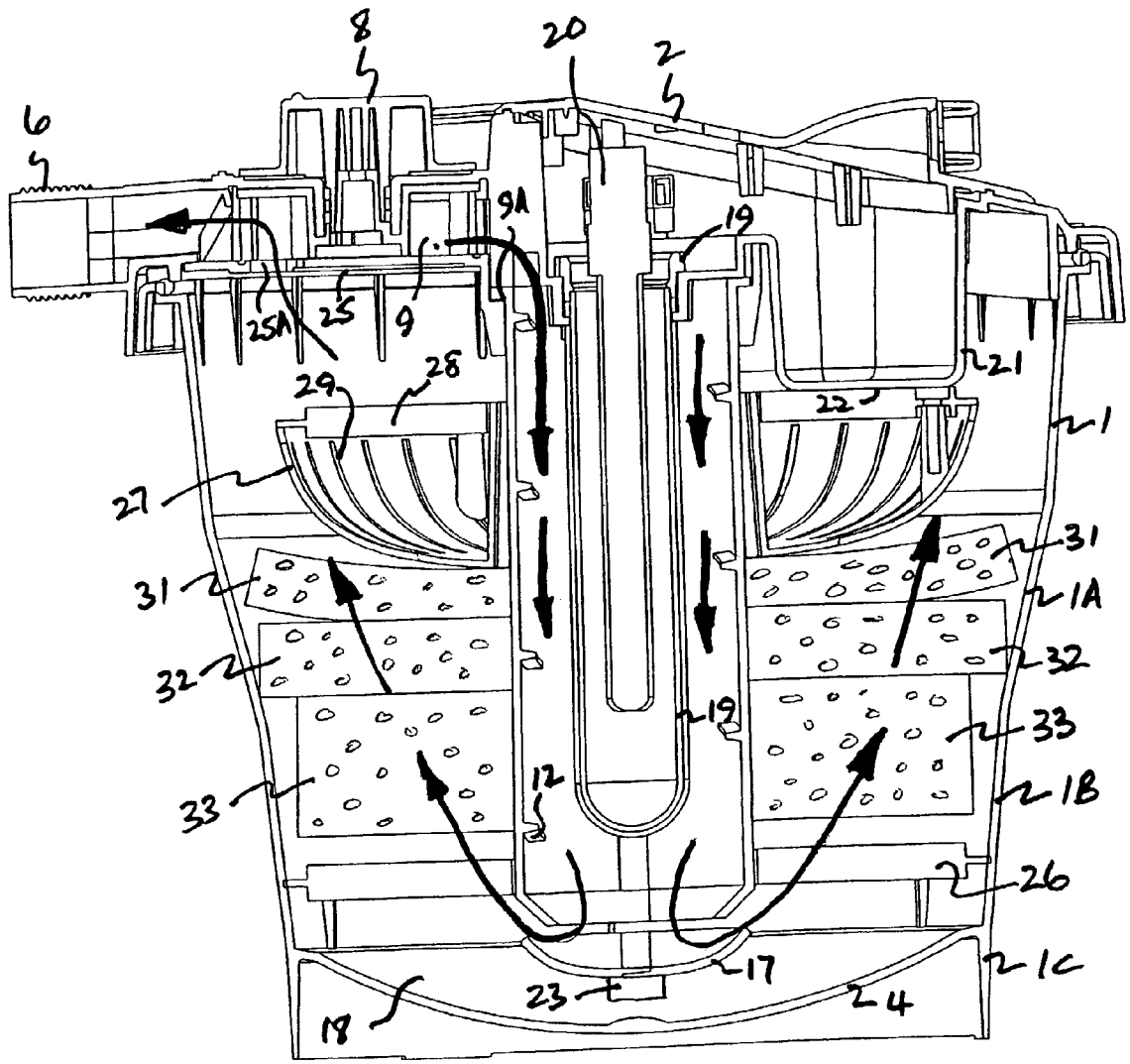
FIG. 3 is a cross section of the filter assembly shown in FIGS. 1 and 2 during normal running.
Figure 3A:
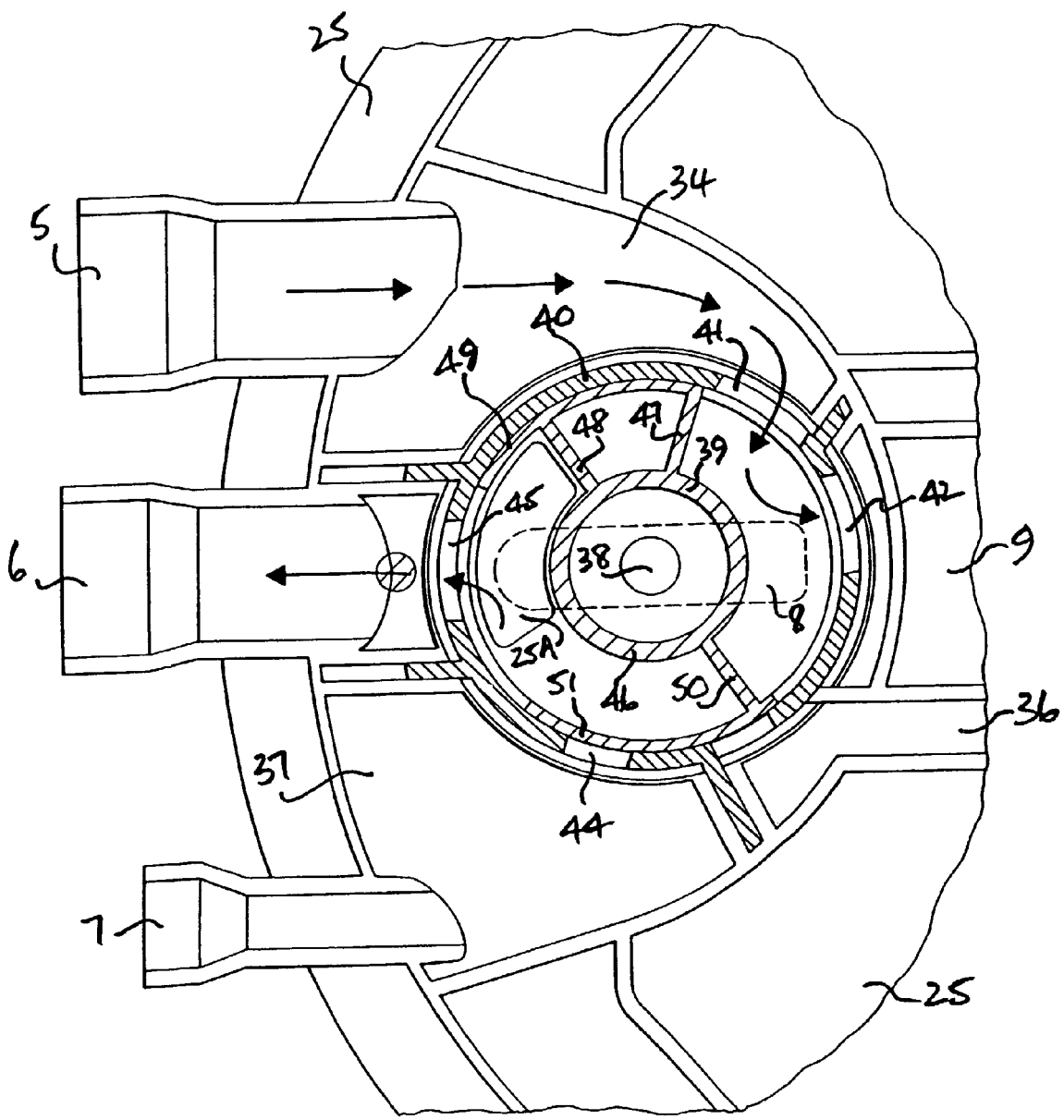
FIG. 3A is a cross sectional plan view of the valve shown in FIG. 3 in its normal running mode.

Referring now to FIG. 3A, it can be seen that the inlet 5 supplies dirty liquid fed, for instance, from a pond or other source to anti-chamber 34 from which it travels via ports 41 and 42 in wall 40 in valve member 38 to passage 9 and inlet 9A into a central feed tube 10 (see FIG. 3) which has a plurality of baffles 12 provided around its internal surface. The bottom of the tube 10 narrows at bevelled section 15 to define an outlet 16 spaced from the bottom 4 of the casing 1. A saucer-shaped baffle 17 is positioned directly opposite the outlet 16 for reasons which will be explained shortly. A cigar tube-shaped casing 19 preferably made of quartz is mounted in the main feed tube 10 and is adapted to receive and mount a UV light 20 therein (see FIG. 4).

A floor 26 is rigidly mounted in the casing 1 around the base of the main tube 10. This floor has perforations (not shown) in it to allow the passage of liquid therethrough. The floor 26 is spaced from the bottom 4 of the casing 1 to provide a settlement chamber 18.

A substantially hemispherical bio-filter 27 with slots 29 therein and a lid 28 is slidably mounted on the main tube 10. This bio-chamber is filled, in use, with biological media such as sintered glass.

The top of the casing 1 beneath the lid 2 is closed by a molding which includes a compartment 21 (see FIG. 3) to house various electrical components which do not form part of the invention. The molding also includes a floor 25 in which inlet 9A is formed (see FIGS. 2 and 3) through which water fed from the valve 38 flows into the feed tube 10.

Figure 4:
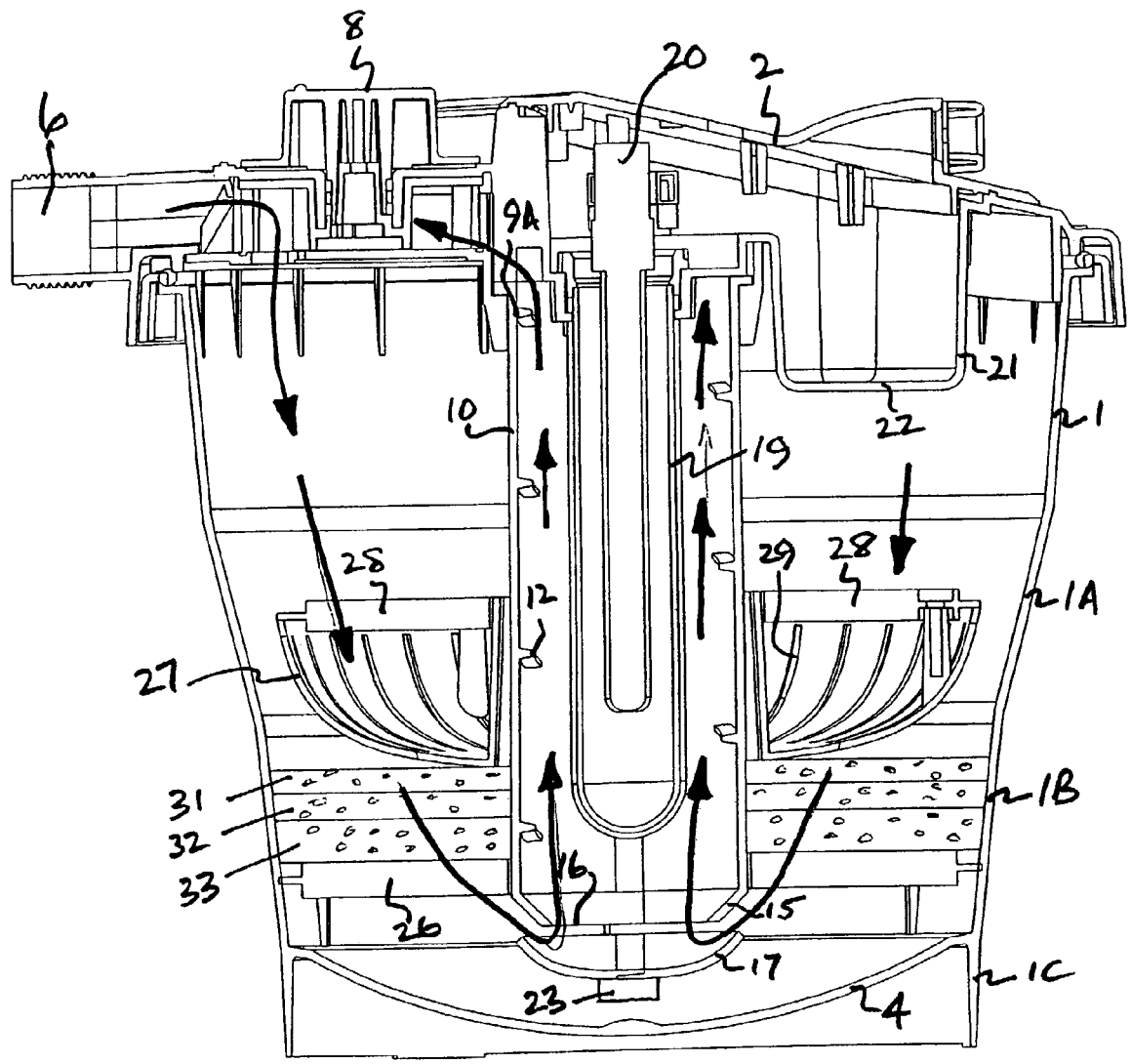
FIG. 4 is a cross section of the filter assembly shown in FIGS. 1 to 3 in its reverse flushing mode showing the compressed filter elements.

As can be seen more clearly in FIGS. 3 and 4, a movable member or piston 31 and filters 32 and 33 are slidably mounted on the central tube 10, one on top of the other. The bio-filter 27 rests on the piston 31 as shown in FIG. 3 and is designed to make an edge seal with the casing 1 during reverse flow. In FIG. 3 showing normal flow, the piston 31 is bent upwardly out of contact with the casing 1. Upward movement of the bio-filter 27 is limited by the engagement of the lid 28 thereof with undersurface 22 of the chamber 21 which houses the electrics (not shown).

The filters 32 and 33 are preferably made of polyethylene foam but other foam materials could be used.

A sludge pipe 23 extends from the settlement chamber 18 upwardly through the casing 1 on the outside of the main tube 10 to the top thereof where it communicates with sludge return passage 36 leading to valve 38 (see FIGS. 3, 3A and 4).

Figure 4A:
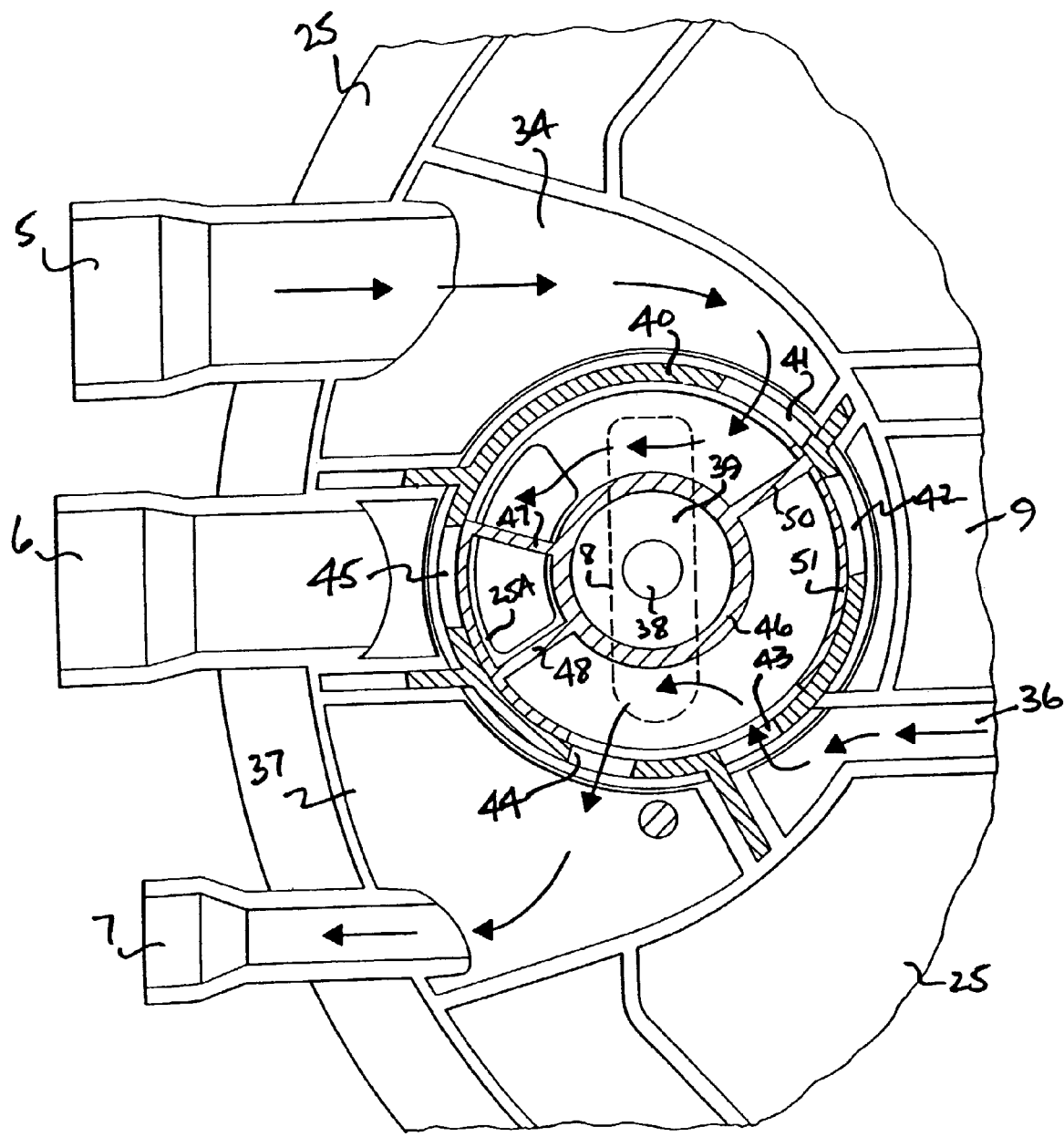
FIG. 4A is a cross sectional plan view of the valve shown in FIG. 4 in its reverse flow flushing mode.
Figure 5:
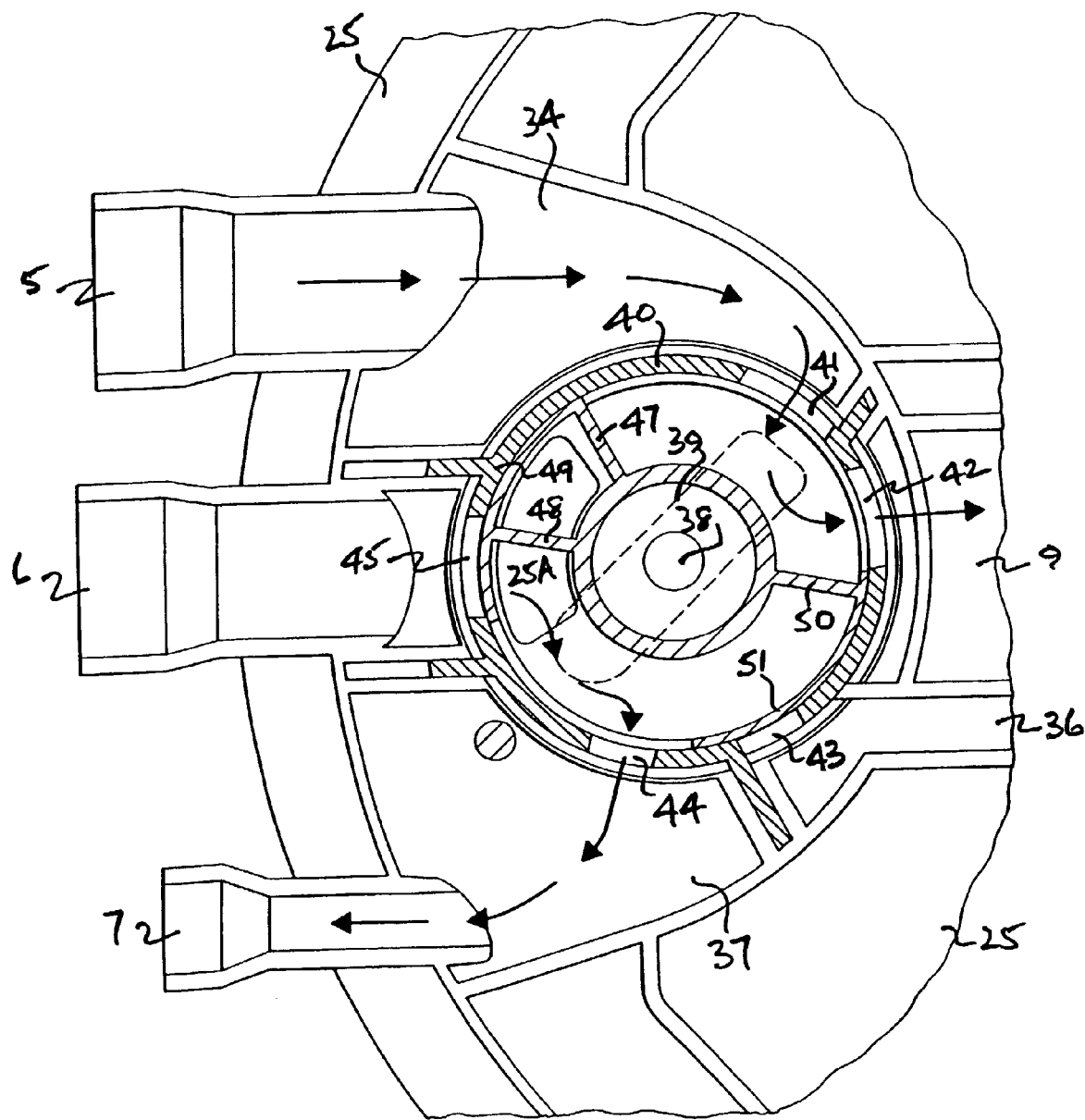
FIG. 5 is a cross sectional plan view of the valve in the filter assembly shown in the previous Figures but in its second stage cleaning mode.

The valve 38 is better illustrated in FIGS. 3A, 4A and 5 and it can be seen that it comprises a rotatable member having a central core 46 rotatably mounted on valve post 39. The core 46 has arms 47, 48 and 50 extending radially outwardly therefrom. Arms 47 and 48 are connected to an arcuate obturator 49. Arm 50 is connected to an arcuate obturator 51. As can be seen from FIG. 3A, the floor 25 includes an anti-chamber 34, passage 9 and chamber 37. The valve 38 is rotatably mounted on its post 39 and cooperates with wall 40 having ports 41,42,43,44 and 45 therein. The sludge return passage 36 is also formed in the floor 25 and communicates with port 43 in the wall 40. The inlet 5 exits into the anti-chamber 34. The outlet 6 communicates with the outlet port 45 in the valve 38 and the second outlet 7 communicates with the chamber 37.

The operation of the illustrated filter assembly will now be described.

During normal running, dirty water is pumped from the pond by a pump (not shown) and it enters the filter assembly through the inlet 5. The valve 38 will be in its first position shown in FIG. 3A so the dirty water will pass in a first direction through the anti-chamber 34, through the port 41 in the wall 40 and out of the juxtaposed port 42 into the inlet passage 9 as indicated by the arrows. As can be seen in FIG. 2, the inlet passage 9 has an outlet 9A therefrom communicating with the interior of the feed tube 10. The water therefore travels down the feed tube 10 and exits therefrom through the outlet 16. Deflector plate 17 directs the water flow radially outwardly and upwardly into the casing 1 through the filters 32 and 33 which remove contaminant therefrom. The upwardly moving water then travels past the piston 31 and through the slots 29 into the interior of the bio-filter 27 which removes contaminants therefrom and it exits the bio-filter 27 and continues on its upward path to leave the casing 1 through the port 25A in the floor 25. As can be seen from FIG. 3A, the port 25A is wholly open when the valve 38 is in the position illustrated so all of the water flow from the interior of the casing 1 passes through exit port 45 in the wall 40 and into the clean water outlet 6 as indicated by the arrows.

As the dirty water leaves the central tube 10 and is deflected upwardly by the baffle 17, contaminant such as dirt will fall to the bottom of the settlement chamber 18. As the dirty water travels up through the filters 32 and 33, further contaminant is removed from the water flow. As can be seen from FIG. 3, upward axial movement of the piston 31 and filters 32 and 33 is limited due to the bio-filter 27 abutting undersurface 22 of the compartment 21. Clean filtered water leaving the outlet 6 can be returned to the pond in known manner for instance by means of a hose (not shown) connected thereto. It should also be noted from FIG. 3A that because the obturator 51 of the valve 38 is blocking off the port 43 in the wall 40, although water can flow from the settlement chamber 18 upwardly through the sludge tube 23 and into the return passage 36, this dirty water and sludge cannot reach the sludge outlet chamber 37 so no water comes out of the sludge outlet 7.

In order to clean the filters 32 and 33 when they become blocked, the valve 38 is moved into its second position shown in FIG. 4A in which the obturator 51 blocks the port 42 in the wall 40. The obturator 49 also blocks off the port 45 leading to the clean water outlet 6 and the leg 47 divides the port 25A in the floor 25 of the valve chamber in half. It will be noted that when the valve 38 is in this position, inlet ports 41 and 43 are open. Outlet port 44 is also open. As shown by arrows, dirty water supplied from the inlet 5 enters the anti-chamber 34 and passes into the interior of the valve 38 via inlet port 41. The only way out of the interior of the valve 38 is through the port 25A in the floor 25 thereof. The dirty water therefore drops through the port 25A into the top of the casing 1 and flows downwardly through the bio-chamber 27 in a second direction and dirt is flushed therefrom.

Water pressure above the piston 31 forces the edge thereof to make a seal with the casing wall, as a result of which it moves axially and it bears down on the filters 32 and 33 and axially squeezes and compresses them. The bio-filter 27 also bears down on the piston and slides down the central tube 10 to the position shown in FIG. 4. This causes dirt and other contaminant to be released from the filters 32 and 33 which collects in the sludge chamber 18. The water then passes upwardly through the casing 1 via the sludge tube 23 (see FIGS. 3 and 4) into the sludge outlet passage 36 (see FIG. 4A). The sludge then travels through the port 43 into the interior of the valve 38 and exits the valve 38 via the port 44 and sludge chamber 37 to the sludge outlet 7. Dirty water exiting the sludge outlet 7 is either pumped into the garden or down a drain. As the obturator 49 on the valve 38 is blocking the outlet 45 in the wall 40, no dirty water can flow out of the outlet 6.

After completion of the flushing of the filters 32 and 33 by the water flow in the second direction in the illustrated embodiment with the valve in its second position, the valve 38 can then be moved to its third position to complete the cleaning process. The third position of the valve is illustrated in FIG. 5 and it can be seen that ports 41, 42 and 44 in the wall 40 are open. Obturator 49 blocks off outlet 45 and obturator 51 blocks off port 43. With the valve in this third position, dirty water enters the filter casing 1 via inlet 5 and passes through the anti-chamber 34 into the valve 38 via port 41. The water exits the valve 38 via port 42 and passes into passage 9 which it leaves via port 9A (see FIG. 3) as has already been described and enters the central tube 10. The dirty water passes down the tube 10 and exits via outlet 16 to pass upwardly through the filters 32 and 33 which expand again and return to their positions shown in FIG. 3. The piston 31 is pushed upwardly which in turn pushes the bio-filter 27 upwardly along the central tube until it abuts the undersurface 22 of the compartment 21 as shown in FIG. 3. The water then exits the casing through the port 25A and enters the interior of the valve 38. The only way out of the interior of the valve 38 is via port 44 as indicated by the arrows so any dirty water in the casing 1 can be flushed out via the sludge outlet 7 and it can be deposited either into the garden or down a drain. Once clean water is seen to be exiting the sludge outlet 7, the operator will know that the filters are now clean and the valve 38 can then be returned to its first position shown in FIG. 3A for normal running. It will be noted that water cannot exit the casing 1 through the sludge pipe 23 which communicates with the sludge exit chamber 36 adjacent the valve 38 because the port 43 from the sludge exit chamber 36 into the interior of the valve 38 is blocked by the obturator 51. Thus, dirty water cannot exit the casing via the outlet 6.

Figure 6:
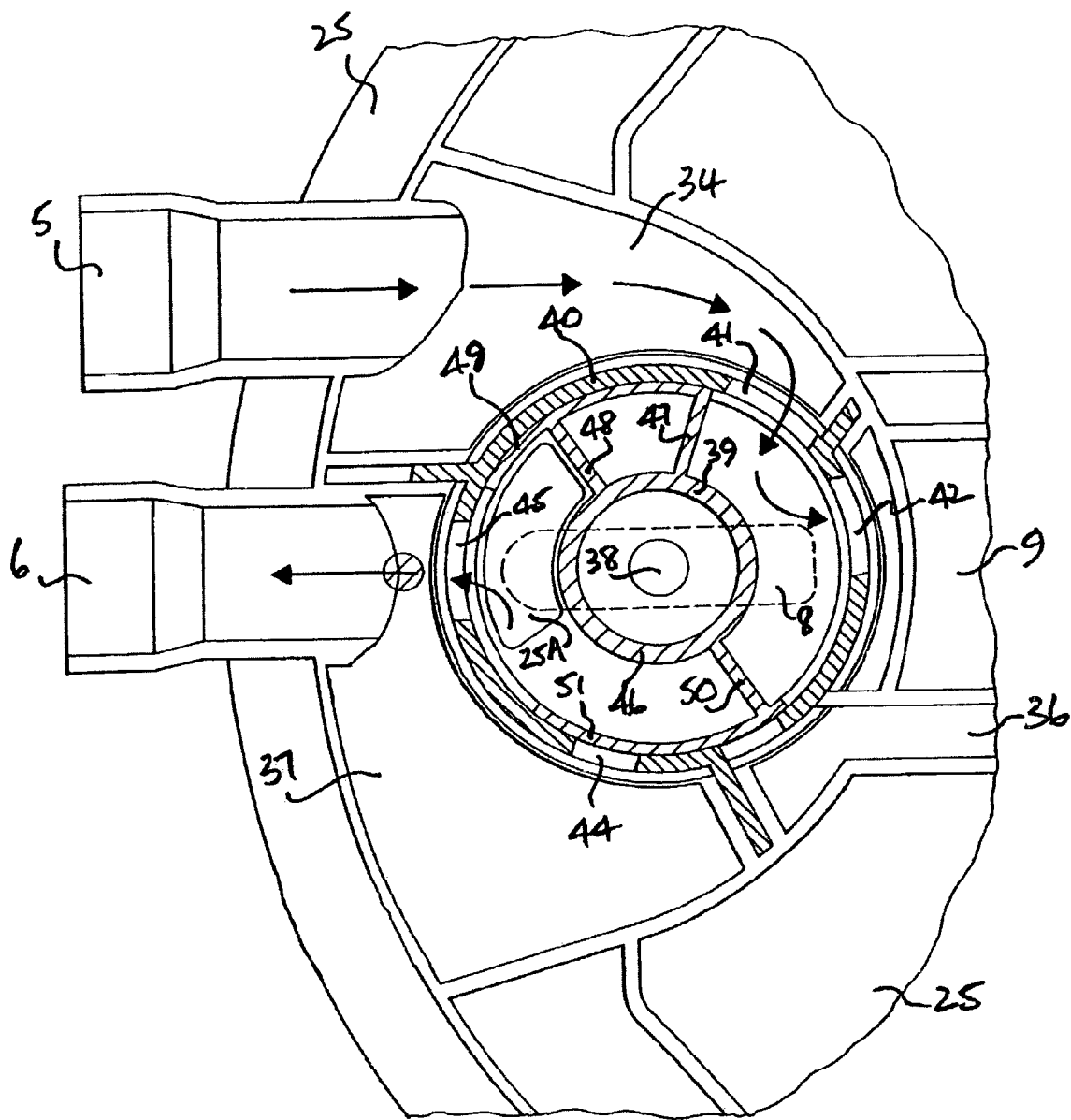
FIG. 6 is a cross sectional plan view of the valve of an alternate embodiment of the invention having only a single outlet in its normal running mode.
Figure 7:
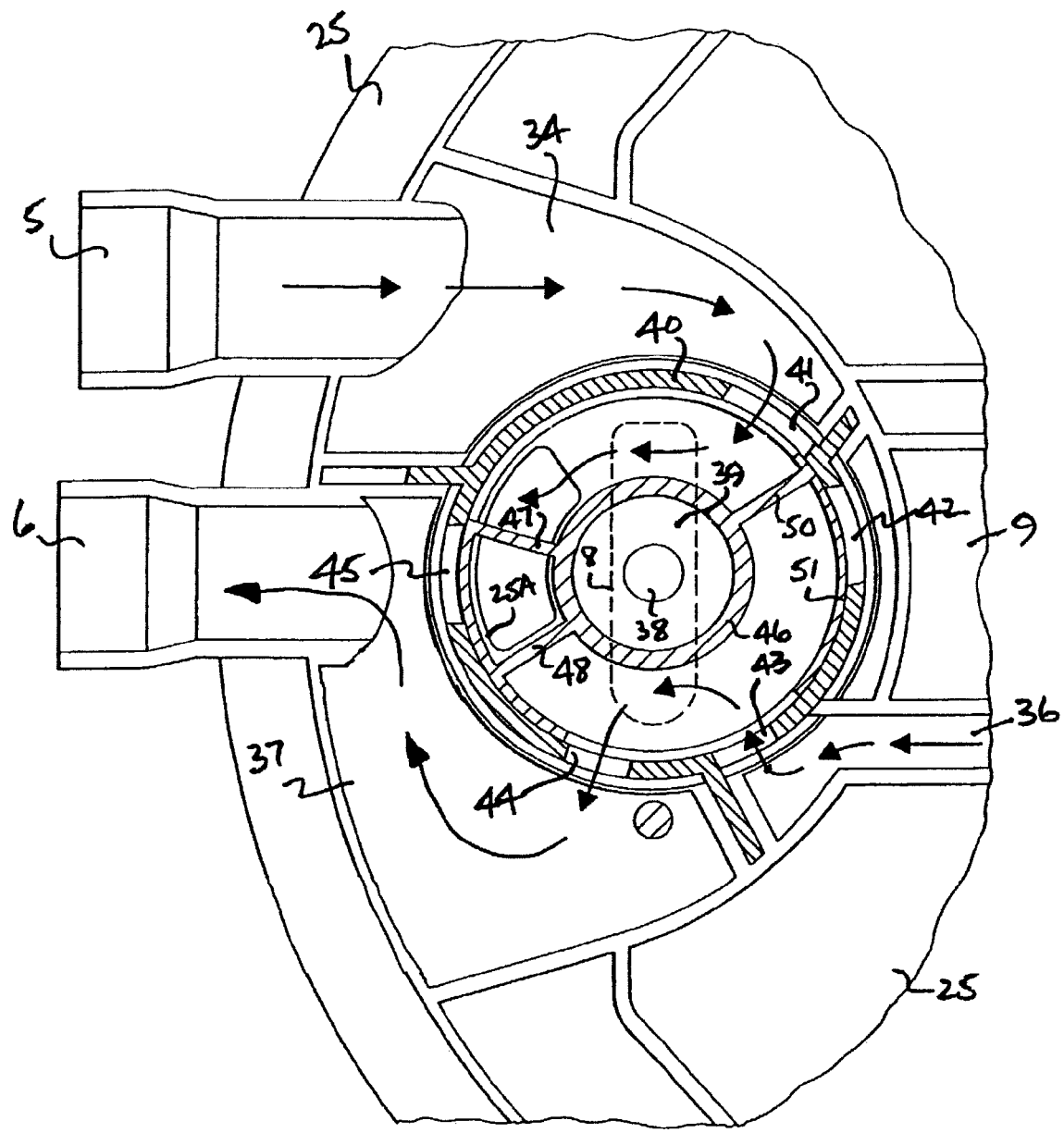
FIG. 7 is a cross sectional plan view of the valve of FIG. 6 in its reverse flow flushing mode.
Figure 8:
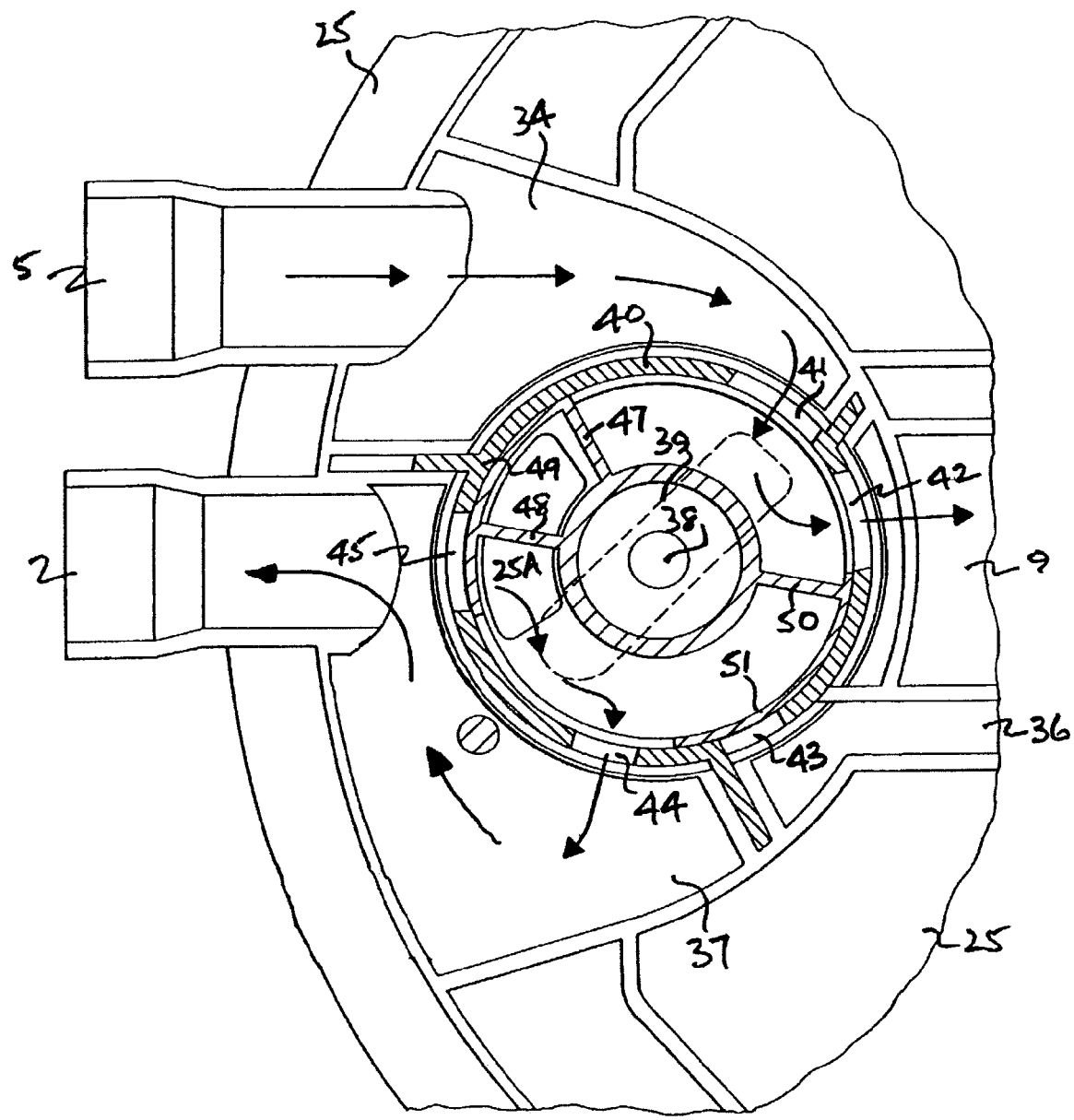
FIG. 8 is a cross sectional plan view of the valve of FIG. 6 in its second stage cleaning mode.

In an alternative embodiment shown in FIGS. 6, 7, and 8, the additional sludge outlet 7 is omitted and the valve 38 reconfigured so that sludge extracted from the filters 32,33 during water flow therethrough in the second direction (reverse flow) is removed from the casing 12 via the clean water outlet 6. To do this, a hose (not shown) normally connected to outlet 6, which feeds clean water back to the pond or other water source to be cleaned, is disconnected and a different hose connected thereto to feed sludge down a drain or elsewhere for disposal. Alternatively, the hose connected to the outlet 6 which feeds clean water back to the pond can be removed from the pond and directed down a drain to dispose of sludge removed from the filters.

Accordingly, the operation of the filter is similar to that described above for the first embodiment, with the modifications as described below.

When the filter is operated in its normal, or cleaning mode, the valve 38 in the alternative embodiment of the invention is in its first position, and the water flow, as shown in FIG. 6, is the same as shown in FIG. 3A for the first embodiment of the invention. That is, the water to be cleaned enters the filter through inlet 5, is directed in a first or forward direction through ports 41 and 42, passage 9 and down the feed tube 10. Thence, the water flows upward through the filter elements 32 and 33 and biofilter 27 and exits the casing 1 through port 25A, port 45, and outlet 6.

When the valve 38 in the alternate embodiment of the invention is in its second position for flushing the filters, the water flow, as shown in FIG. 7 is directed in a reverse direction similar to that shown in FIGS. 4 and 4A. However, after passing through the interior of the casing 1 and entering the sludge outlet passage 36 the water is directed through ports 43 and 44 and sludge chamber 37 to the outlet 6.

For completing the flushing process the valve 38 is then turned to its third position, shown in FIG. 8. In this position the flow is similar to that shown in FIG. 5, except that the water leaves the casing through ports 25A and 44 and sludge chamber 37, from which it passes through the outlet 6.

The invention claimed is:

1. A self-cleaning filter assembly comprising an enclosed casing with a movable member/piston and a filter therein, the casing having an inlet for dirty liquid containing contaminant supplied thereto and a first outlet for clean filtered liquid, the filter assembly being constructed and arranged to provide, in its normal operating mode, a first liquid flow path from the casing inlet to the casing outlet and including the filter and a space adjacent to said movable member and beyond the filter and, in a cleaning mode, to provide a second liquid flow path from the casing inlet to the space adjacent to the movable member, such that the movable member compresses the filter as a result of a force of the liquid flow from the inlet to the space adjacent to the movable member so that contaminant is released from the filter for removal from the filter assembly, and wherein a main tube is provided in the casing to feed liquid from the inlet to the bottom thereof, the main tube having an outlet located adjacent a bottom of the casing.

2. A filter assembly as claimed in claim 1, wherein the casing has an additional outlet therein through which contaminant released from the filter is removed from the casing.

3. A filter assembly as claimed in claim 2, wherein the liquid flow through the casing from the inlet to the or each outlet is controlled by a valve device.

4. A filter assembly as claimed in claim 2, wherein the filter assembly comprises a plurality of separate filter elements stacked one on top of each other.

5. A filter assembly as claimed in claim 4, wherein the filter assembly comprises two filter elements.

6. A filter assembly as claimed in claim 5, wherein each filter element is made of an open cell foam.

7. A filter assembly as claimed in claim 6, wherein the foam material is polyethylene.

8. A filter assembly as claimed in claim 2, wherein the movable member/piston makes an edge seal with the casing in the cleaning mode.

9. A filter assembly as claimed in claim 8, wherein the movable member/piston is made of a closed cell flexible foam material.

10. A filter assembly as claimed in claim 9, wherein the foam material is neoprene foam.

11. A filter assembly as claimed in claim 8, wherein the movable member/piston does not make an edge seal with the casing during liquid flow in the normal operating mode.

12. A filter assembly as claimed in claim 2, wherein the movable member/piston is made of a rigid material with a flexible seal provided around its periphery.

13. A filter assembly as claimed in claim 1, wherein the liquid flow through the casing from the inlet to the outlet is controlled by a valve device.

14. A filter assembly as claimed in claim 1, wherein a deflector is positioned directly opposite the main tube outlet, the deflector being shaped to deflect the liquid flow from the main tube outlet radially outwardly and upwardly into the casing.

15. A filter assembly as claimed in claim 14, wherein the deflector is a saucer-shaped member.

16. A filter assembly as claimed in claim 14, wherein the casing has a perforated floor spaced from the bottom of the casing to provide a settlement chamber for contaminant flushed from the filter, the main tube outlet opening into said chamber.

17. A filter assembly as claimed in claim 16, wherein the filter rests on the perforated floor but is axially movable in the housing along the main tube.

18. A filter assembly as claimed in claim 16, wherein a secondary tube extends through the casing and connects the settlement chamber with an additional outlet through which contaminant in the settlement chamber is removed from the casing.

19. A filter assembly as claimed in claim 18, wherein a movable perforated bio-filter container is mounted around the main and secondary tubes and is slidable therealong, said container normally resting on the top filter element.

20. A filter assembly as claimed in claim 19, wherein an abutment is provided in the casing adjacent the upper end thereof to limit axial movement of the perforated container towards the top of the casing.

21. A filter assembly as claimed in claim 1, wherein the main tube is located centrally in the casing.

22. A filter assembly as claimed in claim 1, wherein the filter assembly comprises a plurality of separate filter elements stacked one on top of each other.

23. A filter assembly as claimed in claim 22, wherein the filter assembly comprises two filter elements.

24. A filter assembly as claimed in claim 23, wherein each filter element is made of an open cell foam.

25. A filter assembly as claimed in claim 24, wherein the foam material is polyethylene.

26. A filter assembly as claimed in claim 1, wherein the movable member/piston makes an edge seal with the casing in the cleaning mode.

27. A filter assembly as claimed in claim 26, wherein the movable member/piston is made of a closed cell flexible foam material.

28. A filter assembly as claimed in claim 27, wherein the foam material is neoprene foam.

29. A filter assembly as claimed in claim 26, wherein the movable member/piston does not make an edge seal with the casing during liquid flow in the normal operating mode.

30. A filter assembly as claimed in claim 1, wherein the movable member/piston is made of a rigid material with a flexible seal provided around its periphery.

31. A self-cleaning filter assembly comprising an enclosed casing with a movable member/piston and a filter therein, the casing having an inlet for dirty liquid containing contaminant supplied thereto and a first outlet for clean filtered liquid, the filter assembly being constructed and arranged to provide, in its normal operating mode, a first liquid flow path from the casing inlet to the casing outlet and including the filter and a space adjacent to said movable member and beyond the filter and, in a cleaning mode, to provide a second liquid flow path from the casing inlet to the space adjacent to the movable member, such that the movable member compresses the filter as a result of a force of the liquid flow from the inlet to the space adjacent to the movable member so that contaminant is released from the filter for removal from the filter assembly, wherein the liquid flow through the casing from the inlet to the outlet is controlled by a valve device, and wherein the valve device comprises a valve assembly mounted in a chamber in the casing, the arrangement being such that liquid supplied to or leaving the casing is fed through the chamber containing the valve assembly, the chamber having a wall with ports therein and a floor with a port therein communicating with the interior of the casing.

32. A filter assembly as claimed in claim 31, wherein when the valve assembly is in a first position liquid is fed from the inlet to the interior of the casing via ports in the wall of the valve chamber, the port in the floor of the valve chamber allowing liquid to leave the casing and flow to only the first liquid outlet.

33. A filter assembly as claimed in claim 32, wherein the casing has an additional outlet therein through which containment released from the filter is removed from the casing, wherein the valve assembly is movable to a second position in which liquid from the inlet is fed to the interior of the casing through the port in the floor of the valve chamber, liquid containing contaminant being fed from the interior of the casing to only the additional liquid outlet via ports in the valve chamber wall.

34. A filter assembly as claimed in claim 33, wherein the valve assembly is also movable to a third position in which liquid is fed from the liquid inlet to the interior of the casing via ports in the wall of the valve chamber, liquid containing contaminant being fed from the interior of the casing to only the additional liquid outlet via the port in the floor of the valve chamber and a port in the wall thereof.

35. A filter assembly as claimed in claim 34, wherein the valve assembly is rotatably mounted in the valve chamber, the valve assembly having portions movable to obturate the ports in the chamber wall to vary the direction of liquid flow when the valve assembly is in said first, second and third positions.

36. A filter assembly as claimed in claim 32, wherein the valve assembly also has a portion which splits the liquid flow through the port in the floor of the valve chamber.

37. A self-cleaning filter assembly comprising an enclosed casing with a movable member/piston and a filter therein, the casing having an inlet for dirty liquid containing contaminant supplied thereto and a first outlet for clean filtered liquid, the filter assembly being constructed and arranged to provide, in its normal operating mode, a first liquid flow path from the casing inlet to the casing outlet and including the filter and a space adjacent to said movable member and beyond the filter and, in a cleaning mode, to provide a second liquid flow path from the casing inlet to the space adjacent to the movable member, such that the movable member compresses the filter as a result of a force of the liquid flow from the inlet to the space adjacent to the movable member so that contaminant is released from the filter for removal from the filter assembly, wherein the casing has an additional outlet therein through which contaminant released from the filter is removed from the casing, and wherein a main tube is provided in the casing to feed liquid from the inlet to the bottom thereof, the main tube having an outlet located adjacent the bottom of the casing.

38. A filter assembly as claimed in claim 37, wherein a deflector is positioned directly opposite the main tube outlet, the deflector being shaped to deflect the liquid flow from the main tube outlet radially outwardly and upwardly into the casing.

39. A filter assembly as claimed in claim 38, wherein the deflector is a saucer-shaped member.

40. A filter assembly as claimed in claim 37, wherein the main tube is located centrally in the casing.

41. A filter assembly as claimed in claim 38, wherein the casing has a perforated floor spaced from the bottom of the casing to provide a settlement chamber for contaminant flushed from the filter, the main tube outlet opening into said chamber.

42. A filter assembly as claimed in claim 41, wherein the filter rests on the perforated floor but is axially movable in the housing along the main tube.

43. A filter assembly as claimed in claim 41, wherein a secondary tube extends through the casing and includes means to connect the settlement chamber with the additional outlet.

44. A filter assembly as claimed in claim 43, wherein a movable perforated bio-filter container is mounted around the main and secondary tubes and is slidable therealong, said container normally resting on the top filter element.

45. A filter assembly as claimed in claim 44, wherein an abutment is provided in the casing adjacent the upper end thereof to limit axial movement of the perforated container towards the top of the casing.

46. A self-cleaning filter assembly comprising an enclosed casing with a movable member/piston and a filter therein, the casing having an inlet for dirty liquid containing contaminant supplied thereto and a first outlet for clean filtered liquid, the filter assembly being constructed and arranged to provide, in its normal operating mode, a first liquid flow path from the casing inlet to the casing outlet and including the filter and a space adjacent to said movable member and beyond the filter and, in a cleaning mode, to provide a second liquid flow path from the casing inlet to the space adjacent to the movable member, such that the movable member compresses the filter as a result of a force of the liquid flow from the inlet to the space adjacent to the movable member so that contaminant is released from the filter for removal from the filter assembly, wherein the casing has an additional outlet therein through which contaminant released from the filter is removed from the casing, wherein the liquid flow through the casing from the inlet to the or each outlet is controlled by a valve device, and wherein the valve device comprises a valve assembly mounted in a valve chamber in the casing, the arrangement being such that liquid supplied to or leaving the casing is fed through the valve chamber, the chamber having a wall with ports therein and a floor with a port therein communicating with the interior of the casing.

47. A filter assembly as claimed in claim 46, wherein when the valve assembly is in a first position liquid is fed from the inlet to the interior of the casing via ports in the wall of the valve chamber, the port in the floor of the valve chamber allowing liquid to leave the casing and flow to only the first liquid outlet.

48. A filter assembly as claimed in claim 47, wherein the valve assembly also has a portion which splits the liquid flow through the port in the floor of the valve chamber.

49. A filter assembly as claimed in claim 47, wherein the casing has an additional outlet therein through which containment released from the filter is removed from the casing, wherein the valve assembly is movable to a second position in which liquid from the inlet is fed to the interior of the casing through the port in the floor of the valve chamber, liquid containing contaminant being fed from the interior of the casing to only the additional liquid outlet via ports in the valve chamber wall.

50. A filter assembly as claimed in claim 49, wherein the valve assembly is also movable to a third position in which liquid is fed from the liquid inlet to the interior of the casing via ports in the wall of the valve chamber, liquid containing contaminant being fed from the interior of the casing to only the additional liquid outlet via the port in the floor of the valve chamber and a port in the wall thereof.

51. A filter assembly as claimed in claim 50, wherein the valve assembly is rotatably mounted in the valve chamber, the valve assembly having portions movable to obturate the ports in the chamber wall to vary the direction of liquid flow when the valve assembly is in said first, second and third positions.

* * * * *